US011945205B2

(12) United States Patent
Aitoh

(10) Patent No.: US 11,945,205 B2
(45) Date of Patent: Apr. 2, 2024

(54) CURVED PANEL PART

(71) Applicant: NIPPON STEEL CORPORATION, Tokyo (JP)

(72) Inventor: Takahiro Aitoh, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/641,379

(22) PCT Filed: Oct. 1, 2019

(86) PCT No.: PCT/JP2019/038788
§ 371 (c)(1),
(2) Date: Mar. 8, 2022

(87) PCT Pub. No.: WO2021/064870
PCT Pub. Date: Apr. 8, 2021

(65) Prior Publication Data
US 2022/0324200 A1  Oct. 13, 2022

(51) Int. Cl.
*B32B 5/12* (2006.01)
*B32B 7/03* (2019.01)
*B32B 15/14* (2006.01)
*B32B 15/18* (2006.01)
*B62D 29/00* (2006.01)

(52) U.S. Cl.
CPC .......... *B32B 7/03* (2019.01); *B32B 2262/101* (2013.01); *B32B 2262/106* (2013.01); *B32B 2307/732* (2013.01); *B32B 2605/08* (2013.01)

(58) Field of Classification Search
CPC ........... B32B 5/12; B32B 15/14; B32B 15/18; B32B 2262/101; B32B 2262/106; B62D 29/005
See application file for complete search history.

(56) References Cited

U.S. PATENT DOCUMENTS

| 4,378,394 A | 3/1983 | Miura et al. |
| 2003/0175455 A1 | 9/2003 | Erb et al. |
| 2020/0239081 A1 | 7/2020 | Higai et al. |

FOREIGN PATENT DOCUMENTS

| EP | 2 889 204 A1 | 7/2015 |
| JP | 57-151357 A | 9/1982 |
| JP | 2001-253371 A | 9/2001 |
| JP | 2003-291232 A | 10/2003 |

(Continued)

*Primary Examiner* — Joanna Pleszczynska
(74) *Attorney, Agent, or Firm* — Birch, Stewart, Kolasch & Birch, LLP

(57) ABSTRACT

A curved panel part includes: a curved panel made of metal; and a reinforcement joined to the curved panel and made of a plurality of FRP layers including continuous fibers, in which each of the plurality of FRP layers has a single fiber direction, at least one layer out of the plurality of FRP layers has a fiber direction different from that of another layer, in the plurality of FRP layers, a proportion of layers having an angular difference in the fiber direction of 30° or more is 15% or more of all of the layers, and when calculating, by defining a maximum principal curvature direction of the curved panel as a 0° direction and a direction orthogonal to the 0° direction as a 90° direction, each of a 0° direction component and a 90° direction component regarding the fiber direction of each FRP layer of the reinforcement joined to the curved panel, by using a trigonometric function, an expression (1) is satisfied.

9 Claims, 6 Drawing Sheets

(56) References Cited

FOREIGN PATENT DOCUMENTS

| | | |
|---|---|---|
| JP | 2008-213437 A | 9/2008 |
| JP | 2008-230235 A | 10/2008 |
| JP | 2009-166408 A | 7/2009 |
| JP | 2018-16171 A | 2/2018 |
| JP | 2018-34664 A | 3/2018 |
| WO | WO 2014/034586 A1 | 3/2014 |
| WO | WO 2019/064909 A1 | 4/2019 | ns
CURVED PANEL PART

TECHNICAL FIELD

The present invention relates to a structure of a panel having a curvature.

BACKGROUND ART

As examples of a panel having a curvature (referred to as "a curved panel", hereinafter), there can be cited metal panels having a curved shape as a whole, such as a door outer panel, a roof panel, a hood, a fender, and a side outer panel of an automobile. In development of automobiles, for realizing a reduction in weight for the purpose of improving fuel efficiency, a reduction in thickness of a steel sheet, for example, used as a material of a curved panel has been in progress. On the other hand, the reduction in thickness of the steel sheet reduces stretch rigidity of the curved panel, so that in order to secure sufficient stretch rigidity, it is demanded to reinforce the curved panel.

As a structure of reinforcing a curved panel, Patent Document 1 discloses a curved panel part which is formed by attaching an FRP (fiber reinforced plastic) sheet to a metal sheet. In the curved panel part of Patent Document 1, a shape of the FRP sheet is appropriately changed, to thereby improve a restoration property when the curved panel is deformed. Patent Document 2 discloses that a CFRP is bonded to a panel in a range of 1 to 30% of an area of the panel, to thereby disperse a load when pushing a center of the panel to an edge part of the panel on a side where the CFRP is bonded. Patent Document 3 discloses a structure including an inner layer made of glass fibers and surrounding a hollow core, an intermediate layer made of an FRP, and an outer layer made of glass fibers. Patent Document 4 discloses a panel structure of a door and the like of an automobile in which, under a reinforced resin layer made of an FRP, a bead forming member such as polyethylene foam whose width is narrower than that of the reinforced resin layer made of the FRP is provided, and a lower surface of a bottom portion of the reinforcement having a width wider than that of the bead forming member is bonded to a panel. Patent Document 5 discloses a roof structure for a vehicle including reinforcements made of an FRP and extending obliquely relative to the widthwise direction of the vehicle. Patent Document 6 discloses an FRP structure with a sandwich construction in which an FRP layer is disposed on a front side and a rear side, respectively, of a core material. Patent Document 7 discloses a structural member in which a reinforcement such as a carbon fiber unidirectional material or a carbon fiber cloth fabric having processed bonding portions in a projecting state, is bonded to a main structural material.

PRIOR ART DOCUMENT

Patent Document

Patent Document 1: Japanese Laid-open Patent Publication No. 2001-253371
Patent Document 2: Japanese Laid-open Patent Publication No. 2018-016171
Patent Document 3: Japanese Laid-open Patent Publication No. 2003-291232
Patent Document 4: Japanese Laid-open Patent Publication No. S57-151357
Patent Document 5: International Publication Pamphlet No. WO 2014/034586
Patent Document 6: Japanese Laid-open Patent Publication No. 2008-213437
Patent Document 7: Japanese Laid-open Patent Publication No. 2009-166408

SUMMARY OF THE INVENTION

Problems to be Solved by the Invention

Patent Document 1 discloses various shapes of the FRP sheet, but the formation of the FRP sheet in the shapes for the purpose of obtaining the reinforcing effect significantly increases manufacturing processes of the FRP sheet, which causes a reduction in productivity. Therefore, it is desirable to reinforce the curved panel by another method. In Patent Document 2, the load when pushing the center of the panel is only dispersed, and thus it is difficult to fundamentally improve the stretch rigidity. The structure in Patent Document 3 has a structure in which the hollow core is necessarily provided in the inner layer, and thus there is a problem such that the structure cannot be applied when an inner space on the reinforcing side of the panel is limited, for example. In the structure of each of Patent Document 4 and Patent Document 5, only a part of the panel is reinforced, so that there is a limitation in the improvement of the stretch rigidity, and if the entire surface of the panel is reinforced, the weight as a whole is increased, which is a problem. The FRP structure of Patent Document 6 has a structure in which the core material is necessarily provided, and thus there is a problem such that the structure cannot be applied when an inner space on the reinforcing side of the panel is limited, for example. In the structure of Patent Document 7, the projecting reinforcement is attached to the main structural material, and thus there is a problem such that the structure cannot be applied when an inner space is limited, for example.

The present invention has been made in view of the above-described circumstances, and an object thereof is to provide a curved panel part capable of improving stretch rigidity without using a cloth fabric.

Means for Solving the Problems

One aspect of the present invention solving the above-described problems is a curved panel part including: a curved panel made of metal; and a reinforcement joined to the curved panel and made of a plurality of FRP layers including continuous fibers, in which each of the plurality of FRP layers has a single fiber direction, at least one layer out of the plurality of FRP layers has a fiber direction different from that of another layer, in the plurality of FRP layers, a proportion of layers having an angular difference in the fiber direction of 30° or more is 15% or more of all of the layers, and when calculating, by defining a maximum principal curvature direction of the curved panel as a 0° direction and a direction orthogonal to the 0° direction as a 90° direction, each of a 0° direction component and a 90° direction component regarding the fiber direction of each FRP layer of the reinforcement joined to the curved panel, by using a trigonometric function, a following expression (1) is satisfied.

$$580 \times K \leq (A \times 4 + B)/(C+D) \tag{1}$$

A: the 0° direction component of the FRP layers positioned on an outer side of a center of a sheet thickness of the reinforcement B: the 0° direction component of the FRP layers positioned on an inner side of the center of the sheet thickness of the reinforcement C: the 0° direction component of the plurality of FRP layers as a whole D: the 90° direction component of the plurality of FRP layers as a whole K: 1/curvature radius in the 0° direction (mm)

The reinforcement may be joined to the curved panel in its area of 70% or more. The reinforcement may be joined to the entire surface of the curved panel. A sheet thickness of the reinforcement may be 2.0 times or more a sheet thickness of the curved panel.

The curved panel may be a hood or a roof panel of an automobile, and the reinforcement may be joined to a lower surface of the curved panel. The curved panel may be a fender, a door outer panel, or a side outer panel of an automobile, and the reinforcement may be joined to a vehicle-interior side surface of the curved panel.

The curved panel may be a steel sheet with 440 MPa or more. The FRP may be a CFRP. The FRP may be a GFRP.

Effect of the Invention

According to the present invention, it is possible to provide a curved panel part capable of improving stretch rigidity without using a cloth fabric.

EMBODIMENTS FOR CARRYING OUT INVENTION

Figure 1:
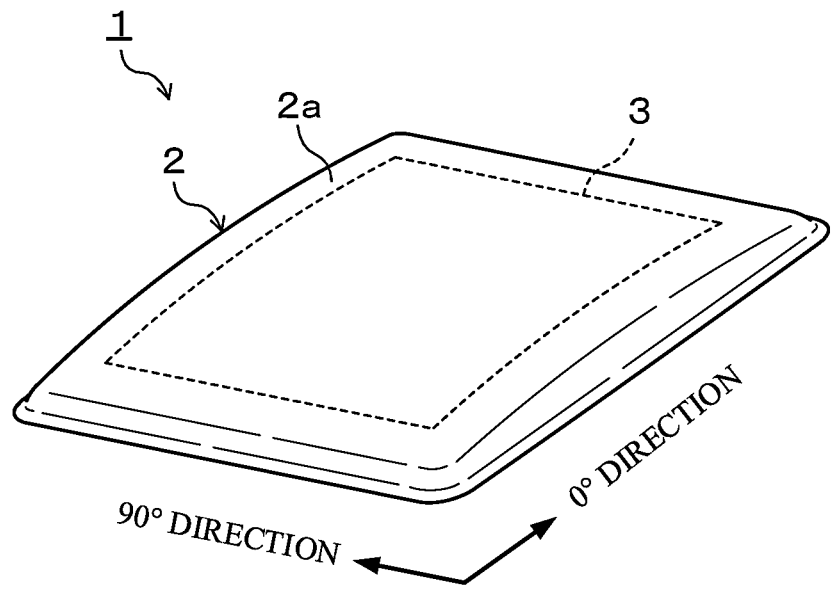
FIG. 1 is a perspective view illustrating a schematic configuration of a curved panel part according to an embodiment of the present invention.

Hereinafter, an embodiment of the present invention will be described while referring to the drawings. Note that in this description and the drawings, elements having substantially the same functional configuration are denoted by the same codes to omit duplicated explanation.

Figure 2:
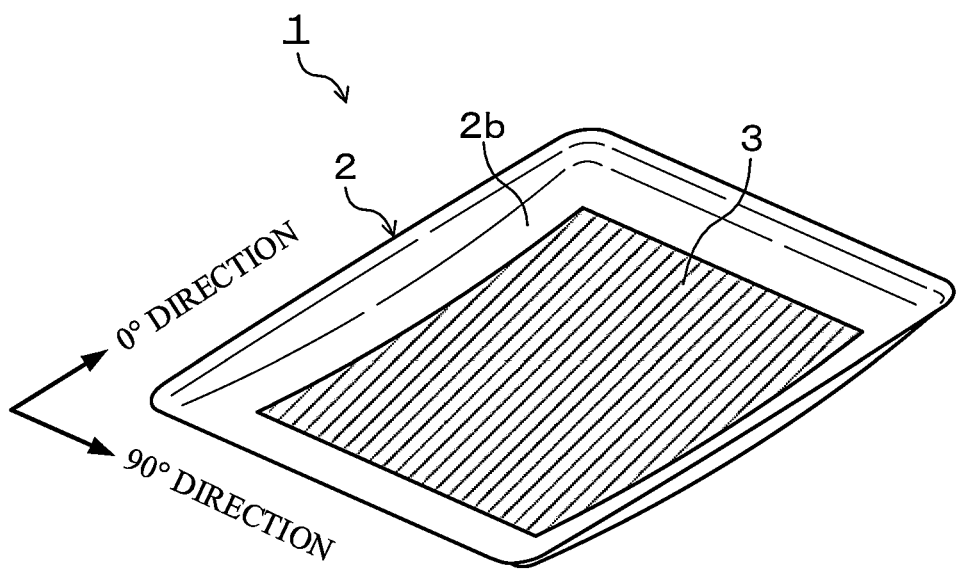
FIG. 2 is a perspective view in which the curved panel part in FIG. 1 is seen from a rear side.
Figure 3:
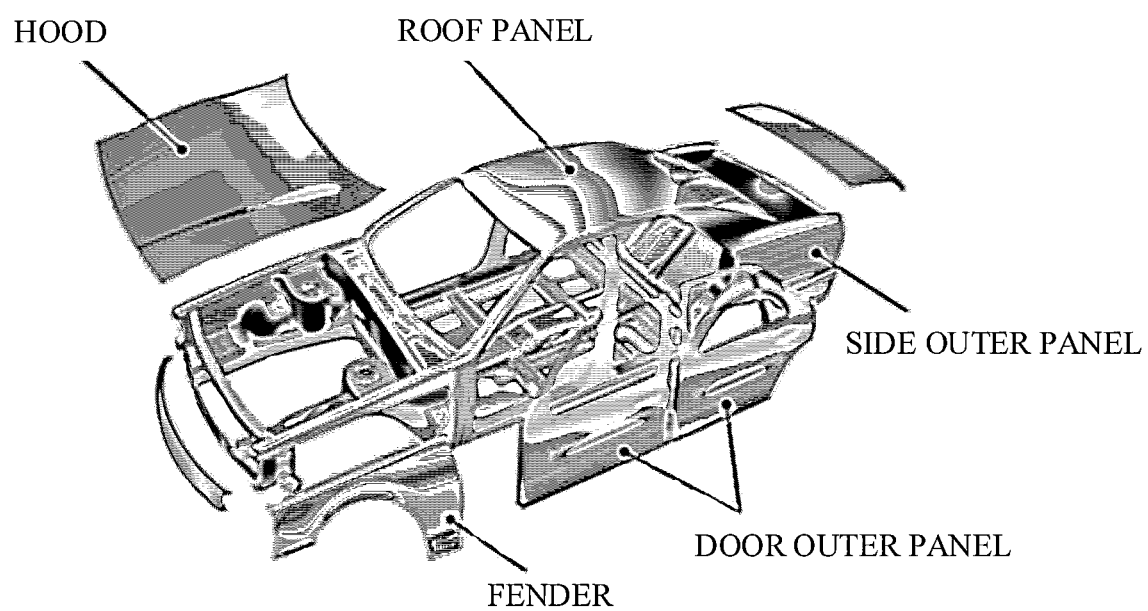
FIG. 3 is a view illustrating an example of a vehicle body structure of an automobile.

As illustrated in FIG. 1 and FIG. 2, a curved panel part 1 of the present embodiment is composed of a curved panel 2 made of metal, and a reinforcement 3 joined to the curved panel 2 and made of a plurality of FRP layers including continuous fibers. Although a material of the curved panel 2 made of metal is not particularly limited, a steel sheet, an aluminum alloy sheet, a magnesium alloy sheet, or the like is used, for example. From a viewpoint of improving stretch rigidity and dent resistance property, the curved panel 2 is preferably formed of a steel sheet with 440 MPa or more. The "curved panel" in this description includes not only a member whose entire panel surface is curved but also a member having a concave, a convex, and a planar portion partially but having a curved shape as a whole. An example of the curved panel 2 includes a part such as a hood, a roof panel, a fender, a door outer panel, or a side outer panel of an automobile, as illustrated in FIG. 3. Further, the curved panel 2 is not limited to the automotive part, and it may also be another panel-shaped member.

Note that the curved panel 2 is obtained by processing a flat sheet. Therefore, at the stage of completing the manufacture of the curved panel 2, a shape and a material as a product are specified, and an application is also determined. Accordingly, it is possible to specify, out of a front-side surface and a rear-side surface of the curved panel 2, a surface to which a load from an out-of-plane direction is more frequently input, when used as a product. For example, in a case of a door outer panel of an automobile, if a front-side surface is set to a vehicle-exterior side surface, and a rear-side surface is set to a vehicle-interior side surface, a load from an out-of-plane direction is more frequently input to the vehicle-exterior side surface than to the vehicle-interior side surface. Specifically, in the example illustrated in FIG. 1, the side on which the reinforcement 3 indicated by a dotted line is joined, becomes a vehicle-interior side surface of a door outer panel. In this description, out of the front-side surface and the rear-side surface of the curved panel 2, the surface to which the load from the out-of-plane direction is more frequently input as described above, is referred to as a "load-input side surface". In the present embodiment, explanation will be made hereinbelow by assuming that, out of curved surfaces 2a, 2b of the curved panel 2, the curved surface 2a being a surface having a smaller curvature is the load-input side surface, but depending on the application of the curved panel 2, the curved surface 2b being a surface having a larger curvature becomes the load-input side surface in some cases.

From a viewpoint of effectively improving the stretch rigidity, the reinforcement 3 is preferably joined to the curved surface 2b on the opposite side of the load-input side. When the curved panel 2 is, for example, a hood or a roof panel of an automobile, the load-input side curved surface 2a is an upper surface (vehicle-exterior side surface) of the curved panel 2, and thus the reinforcement 3 is preferably joined to a lower surface (vehicle-interior side surface) of the curved panel 2. When the curved panel 2 is, for example, a fender, a door outer panel, or a side outer panel of an automobile, the load-input side curved surface 2a is a vehicle-exterior side surface of the curved panel 2, and thus the reinforcement 3 is preferably joined to a vehicle-interior side surface of the curved panel 2.

The reinforcement 3 of the present embodiment is joined to the curved surface 2b of the curved panel 2 on the opposite side of the load-input side. A method of joining the reinforcement 3 to the curved panel 2 is not particularly limited, but they are joined by using an adhesive, for example. From a viewpoint of effectively improving the stretch rigidity of the curved panel part 1, a sheet thickness of the reinforcement 3, namely, a total sheet thickness of the plurality of FRP layers is preferably 2.0 times or more a sheet thickness of the curved panel 2. The sheet thickness of the reinforcement 3 is more preferably 2.5 times or more the sheet thickness of the curved panel 2, and still more preferably 3.0 times or more the sheet thickness of the curved panel 2. Although an upper limit of the sheet thickness of the reinforcement 3 is appropriately set from a viewpoint of required stretch rigidity, weight, and so on of the curved panel part 1, the sheet thickness of the reinforcement is preferably 10.0 times or less the sheet thickness of the curved panel 2, more preferably 7.5 times or less the sheet thickness of the curved panel 2, and still more preferably 5.0 times or less the sheet thickness of the curved panel 2.

Example of Reinforcement

The FRP capable of being used as the reinforcement (also referred to as an FRP material) means a fiber reinforced plastic composed of a matrix resin and a reinforced fiber material contained in the matrix resin to be composite therewith.

As the reinforced fiber material, for example, carbon fibers or glass fibers can be used. Other than the above, as the reinforced fiber material, boron fibers, silicon carbide fibers, aramid fibers, or the like can be used. In the FRP used for the FRP material, as a reinforced fiber base material serving as a base material of the reinforced fiber material, it is possible to use a unidirectional reinforced fiber base material (UD material), or the like, for example. These reinforced fiber base materials can be appropriately selected according to the necessity for orientation of the reinforced fiber material.

The CFRP is the FRP using the carbon fibers as the reinforced fiber material. As the carbon fibers, for example, PAN-based ones or pitch-based ones can be used. The carbon fibers of the CFRP are preferably pitch-based carbon fibers with high elastic modulus. According to the reinforcement 3 using the pitch-based carbon fibers, it is possible to obtain a higher reaction force, and improve the stretch rigidity.

The GFRP is the FRP using the glass fibers as the reinforced fiber material. The glass fibers are inferior in a mechanical property to the carbon fibers, but can suppress electrolytic corrosion of a metal member.

As the matrix resin used for the FRP, either of a thermosetting resin and a thermoplastic resin can be used. As the thermosetting resin, there can be cited an epoxy resin, an unsaturated polyester resin, a vinylester resin, and the like. As the thermoplastic resin, there can be cited polyolefin (polyethylene, polypropylene, or the like) and an acid-modified product thereof, a polyamide resin such as nylon 6 and nylon 66, thermoplastic aromatic polyester such as polyethylene terephthalate and polybutyrene terephthalate, polycarbonate, polyethersulfone, polyphenyleneether and a modified product thereof, polyarylate, polyetherketone, polyetheretherketone, polyetherketoneketone, vinyl chloride, a styrene-based resin such as polystyrene, a phenoxy resin, and the like. Note that the matrix resin may be formed of a plurality of kinds of resin materials.

In consideration of application to the metal member, from a viewpoint of workability and productivity, it is preferable to use the thermoplastic resin as the matrix resin. Moreover, by using the phenoxy resin as the matrix resin, it is possible to increase a density of the reinforced fiber material. Further, the phenoxy resin has heat resistance nearly equal to that of the epoxy resin because a molecular structure thereof closely resembles that of the epoxy resin being the thermosetting resin. Besides, further adding a curing component also enables application to a high-temperature environment. When the curing component is added, its addition amount only needs to be appropriately determined in consideration of impregnating ability into the reinforced fiber material, brittleness of the FRP, tact time, workability, and so on.

<Adhesive Resin Layer>

When the reinforcement is formed by the FRP material or the like, an adhesive resin layer (illustration thereof is omitted) may be provided between the FRP material and the metal member (the curved panel 2 in the present embodiment) to join the FRP material and the metal member by using the adhesive resin layer.

The kind of adhesive resin composition forming the adhesive resin layer is not particularly limited. For example, the adhesive resin composition may be either of the thermosetting resin and the thermoplastic resin. The kinds of the thermosetting resin and the thermoplastic resin are not particularly limited. For example, as the thermoplastic resin, there can be used one or more kinds selected from polyolefin and an acid-modified product thereof, polystyrene, polymethyl methacrylate, an AS resin, an ABS resin, thermoplastic aromatic polyester such as polyethylene terephthalate or polybutyrene terephthalate, polycarbonate, polyimide, polyamide, polyamide-imide, polyetherimide, polyethersulfone, polyphenyleneether and a modified product thereof, polyphenylene sulfide, polyoxymethylene, polyarylate, polyetherketone, polyetheretherketone, polyetherketoneketone, and the like. Further, as the thermosetting resin, for example, there can be used one or more kinds selected from an epoxy resin, a vinylester resin, a phenolic resin, and a urethane resin.

The adhesive resin composition can be appropriately selected according to properties of the matrix resin composing the FRP material, properties of the reinforcement, or properties of the metal member. For example, a resin having a functional group with polarity or a resin subjected to acid modification or the like is used as the adhesive resin layer, thereby improving adhesion properties.

As described above, by making the FRP material bond to the metal member by using the aforementioned adhesive resin layer, it is possible to improve adhesiveness between the FRP material and the metal member. Accordingly, it is possible to improve deformation followability of the FRP material when a load is input to the metal member. In this case, it becomes possible to more securely exhibit the effect of the FRP material with respect to a deformable body of the metal member.

Note that a form of the adhesive resin composition used for forming the adhesive resin layer can be, for example, powder, a liquid such as varnish, or a solid such as a film.

Further, by mixing a crosslinking curable resin and a crosslinking agent with the adhesive resin composition, the crosslinkable adhesive resin composition may be formed. This improves heat resistance of the adhesive resin composition, which thus enables the application under a high-temperature environment. As the crosslinking curable resin, for example, a bifunctional or higher epoxy resin or a crystalline epoxy resin can be used. Further, as the crosslinking agent, an amine, an acid anhydride, or the like can be used. In addition, with the adhesive resin composition, other additives such as various kinds of rubber, an inorganic filler, and a solvent may be mixed in a range not to impair its adhesion properties and physical properties.

The FRP material being composite with the metal member can be achieved by various methods. For example, the FRP or a prepreg for FRP molding being a precursor thereof which serves as the FRP material, and the metal member are bonded by the aforementioned adhesive resin composition to solidify (or cure) the adhesive resin composition, thereby obtaining the FRP material being composite with the metal member. In this case, for example, performing thermocompression bonding allows the FRP material and the metal member to be made composite with each other.

The bonding of the aforementioned FRP or prepreg for FRP molding to the metal member can be performed before molding of parts, during molding thereof, or after molding thereof. For example, after molding a metal material being a workpiece into the metal member, the FRP or the prepreg for FRP molding may be bonded to the metal member. Further, after bonding the FRP or the prepreg for FRP molding to the workpiece by the thermocompression bonding, the workpiece to which the FRP material is bonded may be molded to obtain the metal member being composite therewith. As long as the matrix resin of the FRP material is the thermoplastic resin, a portion to which the FRP material is bonded can also be subjected to molding such as bending. In addition, when the matrix resin of the FRP material is the thermoplastic resin, composite integrated molding in which a thermocompression bonding process and a molding process are integrated may be performed.

Note that the joining method of the FRP material and the metal member is not limited to the bonding by using the aforementioned adhesive resin layer. For example, the FRP material and the metal member may be mechanically joined. More concretely, fastening holes may be formed at positions where the FRP material and the metal member correspond to each other to join the FRP material and the metal member by fastening them through the holes by a fastening means such as bolts or rivets. Other than the above, the FRP material and the metal member may be joined by well-known joining means. Further, the FRP material and the metal member may be joined in a complex manner by a plurality of joining means. For example, the bonding by using the adhesive resin layer and the fastening by the fastening means may be used in a complex manner.

<Metal Member and Surface Treatment Thereof>

The metal member according to the present invention may be a hot-rolled steel sheet or a cold-rolled steel sheet, but those steel sheets may also be plated. This improves corrosion resistance. In particular, when the metal member is a steel material, plating is more suitable. The kind of plating is not particularly limited, and well-known plating can be used. For example, as a plated steel sheet (steel material), there can be used a hot-dip galvanized steel sheet, a hot-dip alloyed galvanized steel sheet, a Zn—Al—Mg-based alloy plated steel sheet, an aluminum-plated steel sheet, an electrogalvanized steel sheet, an electric Zn—Ni-based alloy plated steel sheet, or the like. Although a sheet thickness of the metal member is not necessarily limited in particular, it is often about 0.60 to 3.2 mm when used as a member for automobile, for example.

Further, a surface of the metal member may be covered by a coating film through treatment called conversion treatment. This further improves the corrosion resistance. As the conversion treatment, generally well-known conversion treatment can be used. For example, as the conversion treatment, there can be used zinc phosphate treatment, chromate treatment, chromate-free treatment, or the like. Further, the above-described coating film may also be a well-known resin coating film.

Further, the metal member may be subjected to generally well-known coating. This further improves the corrosion resistance. As the coating, well-known resins can be used. For example, as the coating, there can be used coating in which an epoxy resin, a urethane resin, an acrylic resin, a polyester resin, a fluorine-based resin, or the like is used as a main resin. Further, for the coating, generally well-known pigments may be added according to need. In addition, the coating may be clear coating in which the pigment is not added. Such coating may be performed on the metal member in advance before being composite with the FRP material, or may be performed on the metal member after being composite with the FRP material. Further, after performing the coating on the metal member in advance, the FRP material may be composite therewith to thereafter further perform the coating. A coating material used for the coating may be a solvent-based coating material, a water-based coating material, a powder coating material, or the like. As an execution method of the coating, generally well-known methods can be applied. For example, as the execution method of the coating, there can be used electrodeposition coating, spray coating, electrostatic coating, dip coating, or the like. Because the electrodeposition coating is suitable for covering an end face and a gap portion of the metal member, it is excellent in corrosion resistance after coating. In addition, the generally well-known conversion treatment such as zinc phosphate treatment or zirconia treatment is performed on the surface of the metal member before coating, thereby improving coating film adhesiveness.

(Plurality of FRP Layers)
(Each FRP Layer has a Single Fiber Direction)
(A Proportion of FRP Layers Having an Angular Difference in the Fiber Direction of 30° or More is 15% or More of all of the Layers)

Figure 4:
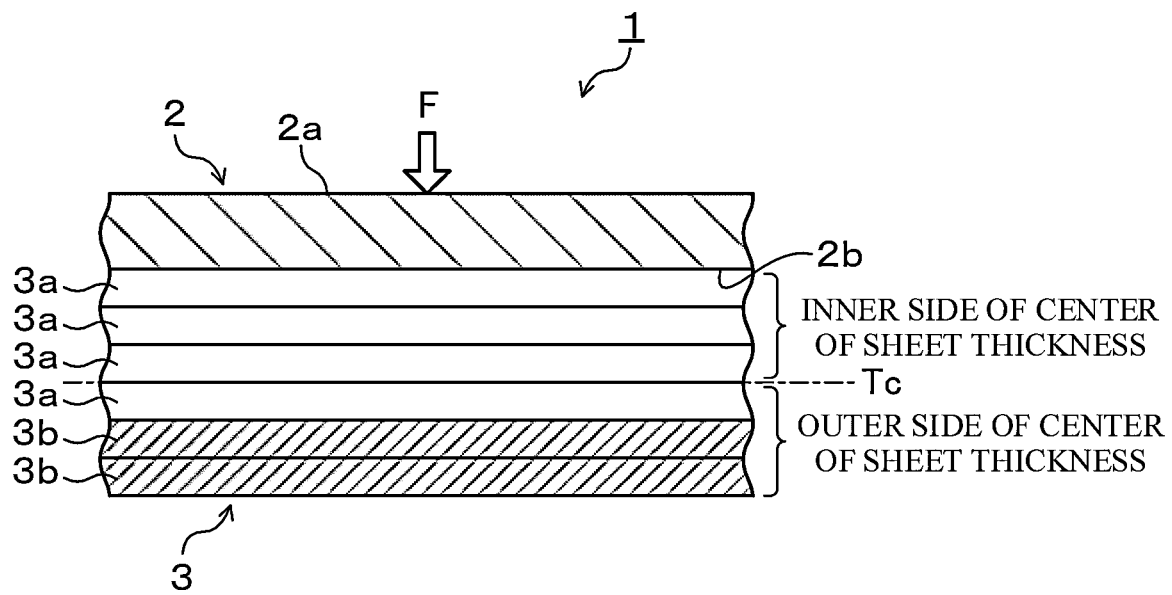
FIG. 4 is a view for explaining a layer structure of a reinforcement according to the present embodiment.

FIG. 4 is a view for explaining a layer structure of the reinforcement 3. Each of the plurality of FRP layers composing the reinforcement 3 has a single fiber direction, and at least one layer out of the plurality of FRP layers has a fiber direction different from that of another layer. Here, in this description, a maximum principal curvature direction of the curved panel 2 is defined as a "0° direction", and a direction orthogonal to the 0° direction when facing the curved surface regarding which the 0° direction is defined, is defined as a "90° direction". In the example illustrated in FIG. 4, the FRP has a six-layer structure, and out of the plurality of FRP layers, four layers close to the curved surface 2b of the curved panel 2 have continuous fibers oriented in the 0° direction, and the rest of the two layers have continuous fibers oriented in the 90° direction. Note that in this description, a layer having continuous fibers oriented in a single specific direction is referred to as an "oriented layer". For example, a layer having fibers oriented in the 0° direction is referred to as a 0° oriented layer, and a layer having fibers oriented in the 90° direction is referred to as a 90° oriented layer. Specifically, the reinforcement 3 illustrated in FIG. 4 has four 0° oriented layers 3a, and two 90° oriented layers.

Note that a "θ° oriented layer" also includes an oriented layer composed of continuous fibers oriented in θ±5°. For example, the "0° oriented layer" includes not only an FRP layer having continuous fibers whose fiber direction is strictly oriented in the 0° direction but also an oriented layer including continuous fibers oriented in −5° to 5° relative to the 0° direction. The fiber direction of the oriented layer can be identified by observing and analyzing a fiber-reinforced resin material by using a micro-focus X-ray CT (X-ray Computed Tomography). The total number of the layers composing the reinforcement 3 is not particularly limited, and is appropriately changed according to the shape of the curved panel 2, the required stretch rigidity, and so on. Further, the size of the reinforcement 3, the sheet thickness of each layer of the FRP, a joint position of the reinforcement 3 with respect to the curved panel 2, and so on are also not limited in particular, and are appropriately changed according to the shape of the curved panel 2, the required stretch rigidity, and so on.

Incidentally, when the inventors of the present application evaluated the stretch rigidity of a member in which a material formed in a manner that fibers in two or more directions are woven in one layer of an FRP, such as the carbon fiber cloth fabric in Patent Document 7, is attached to a curved panel, an effect of improving the stretch rigidity was small. Although the reason thereof is unclear, the cloth fabric has wavy fibers, which may exert an influence. The present invention was created as a result of research, based on the evaluation result, regarding the improvement of stretch rigidity by stacking FRP layers each having a single fiber direction, without using the cloth fabric. For this reason, the reinforcement according to the present invention is composed of a plurality of FRP layers, and each of the plurality of FRP layers has a single fiber direction.

According to the studies conducted by the inventors of the present application, it was clarified that even if each of the FRP layers has a single fiber direction, when all of the fiber directions of the plurality of FRP layers are the same (for example, the fiber directions of all of the FRP layers are directions perpendicular to the maximum principal curvature, namely, all of the FRP layers are 90° oriented layers), the effect of improving the stretch rigidity is small, as will be described later. Based on this finding, the inventors found out that, in order to improve the stretch rigidity, it is preferable that the fiber directions of the plurality of FRP layers are not oriented in a single direction, there exists an FRP layer having an angular difference in the fiber direction of 30° or more, and a proportion of the FRP layers having an angular difference in the fiber direction of 30° or more is set to 15% or more of all of the FRP layers. In the FRP layers having different fiber directions, a value of "a proportion of the FRP layers having an angular difference in a fiber direction of 30° or more relative to all of the layers" changes depending on a fiber direction set as a reference among a plurality of fiber directions, but in this description, it is set that the aforementioned proportions when the respective fiber directions are set as references are respectively calculated, and a value of the smallest proportion is used. For example, in CASE a11 in Examples to be described later, a proportion of FRP layers having an angular difference of 30% or more relative to all of the layers when the 90° direction is set as a reference, is 67% (four layers/six layers=0.67), and the aforementioned proportion when the 0° direction is set as a reference, is 33% (two layers/six layers=0.33). Therefore, a value of the smallest proportion in this case is 33%, and thus the proportion of FRP layers having an angular difference in the fiber direction of 30° or more, is 33% of all of the layers. Note that the calculation based on the above-described method is performed when the thicknesses of the respective FRP layers and the densities of FRP fibers are substantially the same, but when the thicknesses of the respective layers and the densities are different, the aforementioned proportion is calculated by setting the thicknesses of the respective layers and the densities as weights.

The angular difference of the FRP layer is preferably larger, and is preferably 40° or more, 50° or more, or 60° or more. An upper limit of the angular difference is 90°, as a matter of course. The proportion of FRP layers each having a fiber direction with a predetermined angular difference or more relative to all of the layers is preferably larger, and is preferably 20% or more, 25% or more, or 30% or more. However, an upper limit of the proportion is 50%.

The curved panel part 1 is configured as described above. In a case of the curved panel 2 as illustrated in FIG. 1, when a load F from an out-of-plane direction is input to the load-input side curved surface 2a of the curved panel 2, a substantially circular strain is generated in a periphery of a load-input position. The present inventor found out that, in such a case, the stretch rigidity is effectively improved by using the curved panel part 1 to which the reinforcement 3 in which at least one layer out of the plurality of FRP layers has a fiber direction different from that of another layer, a proportion of FRP layers having an angular difference in the fiber direction of 30° or more is 15% or more of all of the layers, and a following expression (1) is satisfied, is joined.

$$580 \times K \leq (A \times 4 + B)/(C+D) \quad (1)$$

A: the 0° direction component of the FRP layers positioned on an outer side of a center of a sheet thickness of the reinforcement B: the 0° direction component of the FRP layers positioned on an inner side of the center of the sheet thickness of the reinforcement C: the 0° direction component of the plurality of FRP layers as a whole D: the 90° direction component of the plurality of FRP layers as a whole K: 1/curvature radius in the 0° direction (mm)

(Calculation Method of 0° Direction Component and 90° Direction Component)

Figure 5:
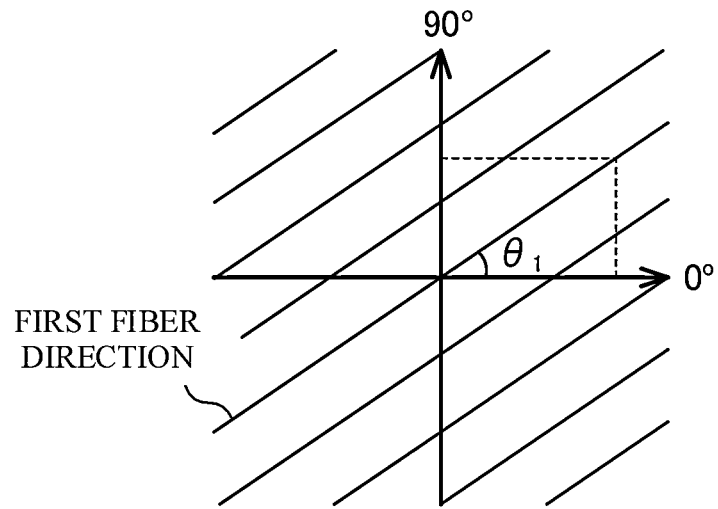
FIG. 5 is a view for explaining a calculation method of a 0° direction component and a 90° direction component of a fiber direction.
Figure 6:
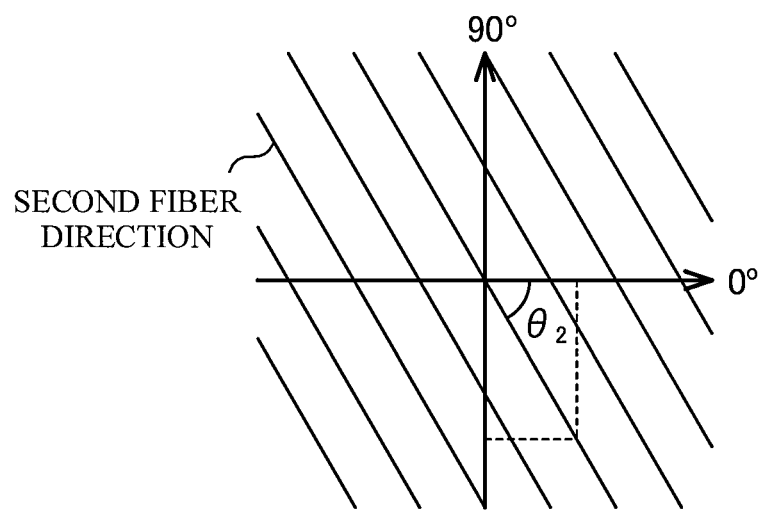
FIG. 6 is a view for explaining a calculation method of a 0° direction component and a 90° direction component of a fiber direction.

In this description, the proportions of the 0° direction component (a component parallel to the maximum principal curvature direction of the curved panel 2) and the 90° direction component (a component parallel to a direction perpendicular to the maximum principal curvature direction of the curved panel 2) are calculated as follows. Here, an example will be described in which two kinds of fiber directions are included in the FRP layers as a whole composing the reinforcement joined to the curved panel 2. FIG. 5 illustrates an FRP layer having a first fiber direction whose angle (acute angle) made with the 0° direction is $\theta_1$, and FIG. 6 illustrates an FRP layer having a second fiber direction whose angle (acute angle) made with the 0° direction is $\theta_2$. The first fiber direction and the second fiber direction are mutually different directions. The "0° direction component" in this description has an absolute value of the 0° direction component calculated by performing, with the use of a trigonometric function, component decomposition on the fiber direction of the FRP layer into the 0° direction component (namely, $\cos \theta_1$, or $\cos \theta_2$) and the 90° direction component (namely, $\cos(90°-\theta_1)=\sin \theta_1$, or $\cos(90°-\theta_2)=\sin \theta_2$). Further, the "90° direction component" in this description has an absolute value of the 90° direction component calculated by performing, with the use of a trigonometric function, component decomposition on the fiber direction of the FRP layer into the 0° direction component and the 90° direction component.

When calculating the 0° direction component of the layers as a whole ("C" in the expression (1)) and the 90° direction component of the layers as a whole ("D" in the expression (1)) in the above-described expression (1), at first, regarding the FRP layer having the first fiber direction, the angle $\theta_1$ is subjected to component decomposition to calculate the 0° direction component and the 90° direction component. At this time, if there is another FRP layer having the first fiber direction, the angle $\theta_1$ of that layer is also subjected to component decomposition to calculate the 0° direction component and the 90° direction component, in a similar manner. Next, regarding the FRP layer having the second fiber direction, the angle $\theta_2$ is subjected to component decomposition to calculate the 0° direction component and the 90° direction component. At this time, if there is another FRP layer having the second fiber direction, the angle $\theta_2$ of that layer is also subjected to component decomposition to calculate the 0° direction component and the 90° direction component, in a similar manner. In the manner as described above, the 0° direction component and the 90° direction component are calculated regarding each of the layers, and then the 0° direction components of the respective layers are totalized, resulting in that the 0° direction component of the layers as a whole in the expression (1) ("C" in the expression (1)) is calculated. In a similar manner, by totalizing the 90° direction components of the respective layers, the 90° direction component of the layers as a whole in the expression (1) ("D" in the expression (1)) is calculated.

For example, when the angle $\theta_1$ in FIG. 5 is 30°, an absolute value of cos 30° is the 0° direction component, and an absolute value of sin 30° is the 90° direction component. Specifically, the 0° direction component and the 90° direction component regarding the first fiber direction when the angle $\theta_1$ is 30°, are about 0.866 and 0.5, respectively. Further, when the angle $\theta_2$ in FIG. 6 is −60°, an absolute value of cos −60° is the 0° direction component, and an absolute value of sin −60° is the 90° direction component. Specifically, the 0° direction component and the 90° direction component regarding the second fiber direction when the angle $\theta_2$ is −60°, are 0.5 and about 0.866, respectively. In FIG. 5 and FIG. 6, if there are four layers having the first fiber direction, and two layers having the second fiber direction, the 0° direction component of the layers as a whole is about 4.46 (0.866×4+0.5×2), and the 90° direction component of the layers as a whole is about 3.73 (0.5×4+ 0.866×2). The total value of the 0° direction component and the total value of the 90° direction component are calculated in the manner as described above. Note that when the fiber direction is the 0° direction, a value of the 0° direction component is cos 0°, namely, 1, and a value of the 90° direction component is sin 0°, namely, 0. Further, when the fiber direction is the 90° direction, a value of the 0° direction component is cos 90°, namely, 0, and a value of the 90° direction component is sin 90°, namely, 1.

Further, the calculation based on the above-described method is performed when the thicknesses of the respective FRP layers and the densities of FRP fibers are substantially the same, but when the thicknesses of the respective layers and the densities are different, the aforementioned proportion is calculated by setting the thicknesses of the respective layers and the densities as weights. For example, when a value of the 0° direction component of a k-th layer from the joint side out of the FRP of n layers is set to $x_k$, and a thickness of the layer is set to $t_k$, the total value of the 0° direction component of the layers as a whole is obtained by $x_1 \times t_1 + \ldots + x_n \times t_n$. The total value of the 90° direction component is also obtained in a similar manner.

In this description, an FRP layer positioned on a joint side with respect to the curved panel 2, relative to a center $T_c$ of the sheet thickness of the reinforcement 3 (namely, the total sheet thickness of respective layers), is referred to as "a layer positioned on an inner side of the center $T_c$ of the sheet thickness", and an FRP layer positioned on the opposite side of the joint side, is referred to as "a layer positioned on an outer side of the center $T_c$ of the sheet thickness". For example, when, in the reinforcement 3 in FIG. 4, it is assumed that all of the sheet thicknesses of the respective FRP layers are equal, three layers on the lower side out of six FRP layers are layers positioned on the outer side of the center $T_c$ of the sheet thickness of the reinforcement 3, and three layers on the upper side out of the six FRP layers are layers positioned on the inner side of the center of the sheet thickness of the reinforcement 3. Therefore, in the example in FIG. 4, the 0° direction component of the FRP layers positioned on the outer side of the center of the sheet thickness of the reinforcement 3 in the expression (1) ("A" in the expression (1)) is the total value of the 0° direction components of the three layers on the lower side out of the six FRP layers, and the 0° direction component of the FRP layers positioned on the inner side of the center of the sheet thickness of the reinforcement 3 in the expression (1) ("B" in the expression (1)) is the total value of the 0° direction components of the three layers on the upper side out of the six FRP layers.

"K" in the expression (1) is a value obtained of dividing "1" by a curvature radius in the 0° direction of the curved panel 2, and corresponds to a maximum principal curvature. "K" in the expression (1) is an index indicating what kind of shape the curved panel 2 has, so that in the explanation hereinbelow, "K" in the expression (1) is referred to as a shape index K. In order to improve the stretch rigidity of the curved panel part 1, it is important to define the fiber direction of each FRP layer, but the influence of the fiber direction of the FRP exerted on the stretch rigidity of the curved panel part 1 becomes different depending also on the shape of the curved panel 2. In other words, a contribution degree of the fiber direction of the FRP with respect to the stretch rigidity becomes different depending on the shape of the curved panel 2. Therefore, in order to improve the stretch rigidity of the curved panel part 1, it is important to define the fiber direction of the FRP after taking the shape of the curved panel 2 as well into consideration.

The condition satisfying this requirement is the expression (1). As will be described later in Examples, with the use of the curved panel part 1 including the reinforcement 3 in which at least one layer out of the plurality of FRP layers has a fiber direction different from that of another layer, a proportion of FRP layers having an angular difference in the fiber direction of 30° or more is 15% or more of all of the layers, and the expression (1) is satisfied, it is possible to improve the stretch rigidity.

Figure 7:
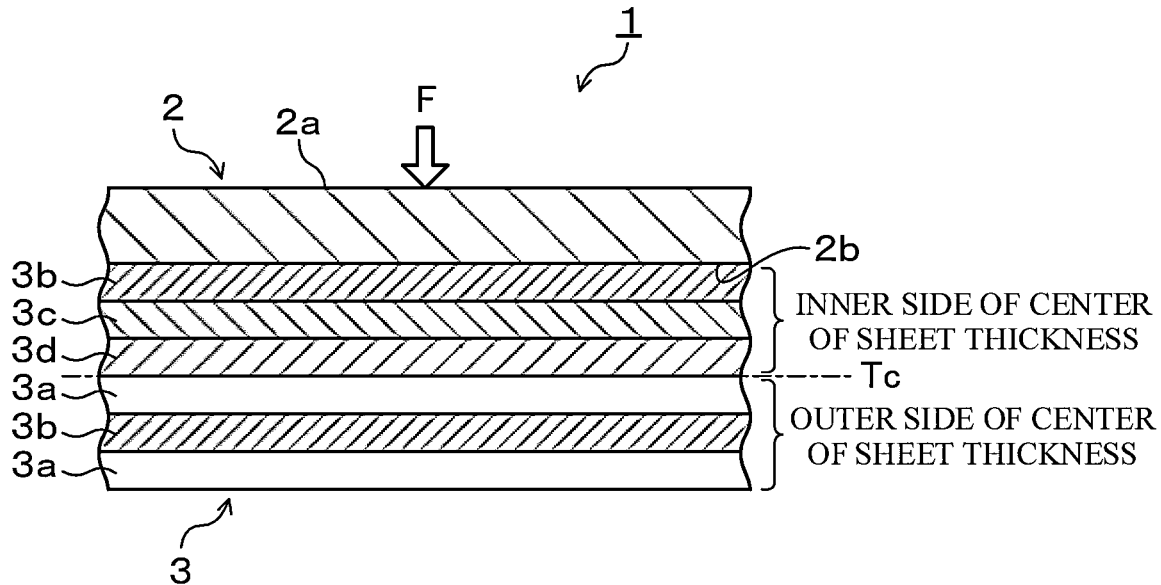
FIG. 7 is a view illustrating an example of a layer structure of a reinforcement according to the present embodiment.

Note that in the explanation of the present embodiment, there are two fiber directions, but there may be three or more fiber directions. For instance, the reinforcement 3 illustrated in FIG. 7 has a 90° oriented layer 3b, a 45° oriented layer 3c, a −45° oriented layer 3d, a 0° oriented layer 3a, the 90° oriented layer 3b, and the 0° oriented layer 3a, in the order from the curved surface 2b of the curved panel 2. Even in such a case, since the reinforcement 3 in which at least one layer out of the plurality of FRP layers has a fiber direction different from that of another layer, a proportion of FRP layers having an angular difference in the fiber direction of 30° or more is 15% or more of all of the layers, and the expression (1) is satisfied, is joined to the curved panel 2, it is possible to improve the stretch rigidity of the curved panel part 1.

Further, although the effect of improving the stretch rigidity can be obtained even if the reinforcement 3 is joined to the curved surface 2a of the curved panel 2, the reinforcement 3 is preferably joined to the curved surface 2b on the opposite side of the curved surface 2a. For example, when the curved panel 2 is a part such as a door outer panel, a roof panel, a hood, a fender, or a side outer panel of an automobile, the load F from the out-of-plane direction is input to the load-input side curved surface 2a of the curved panel 2, so that a tensile stress on the curved surface 2b side of the curved panel 2 becomes large. However, if the reinforcement 3 is joined to the curved surface 2b of the curved panel 2, it is possible to effectively reinforce a portion where the tensile stress is generated. Consequently, the effect of improving the stretch rigidity of the curved panel 2 is more likely to be obtained.

Figure 8:
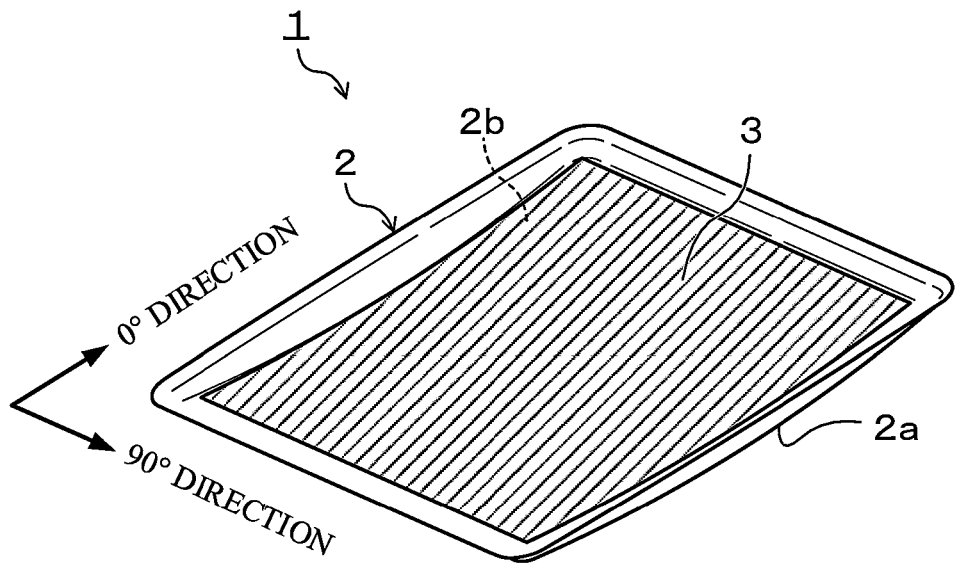
FIG. 8 is a view illustrating an example of joint between a curved panel and a reinforcement.

Further, the reinforcement 3 is preferably joined to the entire surface of the curved panel 2, as illustrated in FIG. 8. For example, even in a case where the reinforcement 3 is partially joined to the curved panel 2, it is possible to partially improve the stretch rigidity. However, when the reinforcement 3 is joined to the entire surface of the curved panel 2, it becomes possible to obtain a stiffening effect by the reinforcement 3 even if a load is input at any position of the curved panel 2. Even when the reinforcement 3 is not joined to the entire surface of the curved panel 2, it is preferably joined to the curved panel 2 in its area of 70% or more. The reinforcement 3 is more preferably joined to the curved panel 2 in its area of 80% or more, and still more preferably joined to the curved panel 2 in its area of 90% or more.

Further, when the reinforcement 3 satisfying the expression (1) has the same shape as that of the FRP sheet in the above-described Patent Document 1, for example, the stiffening effect to be exhibited becomes larger than that of the FRP sheet in Patent Document 1. Specifically, when it is possible to satisfy a product specification regarding the stretch rigidity, with the stiffening effect equal to the stiffening effect in Patent Document 1, it is also possible to reduce a weight of the curved panel part 1 by reducing the sheet thickness of the reinforcement 3, for example. For this reason, when the reinforcement 3 is joined to the entire surface of the curved panel 2, it is possible to realize a reduction in weight of the panel part and secure sufficient stretch rigidity, when compared to a conventional case where a plurality of FRP sheets are joined to the entire panel.

Although one embodiment of the present invention has been explained above, the present invention is not limited to such an example. It should be understood that various changes or modifications are readily apparent to those skilled in the art within the scope of the technical idea as set forth in claims, and those should also be covered by the technical scope of the present invention.

Examples

Figure 9:
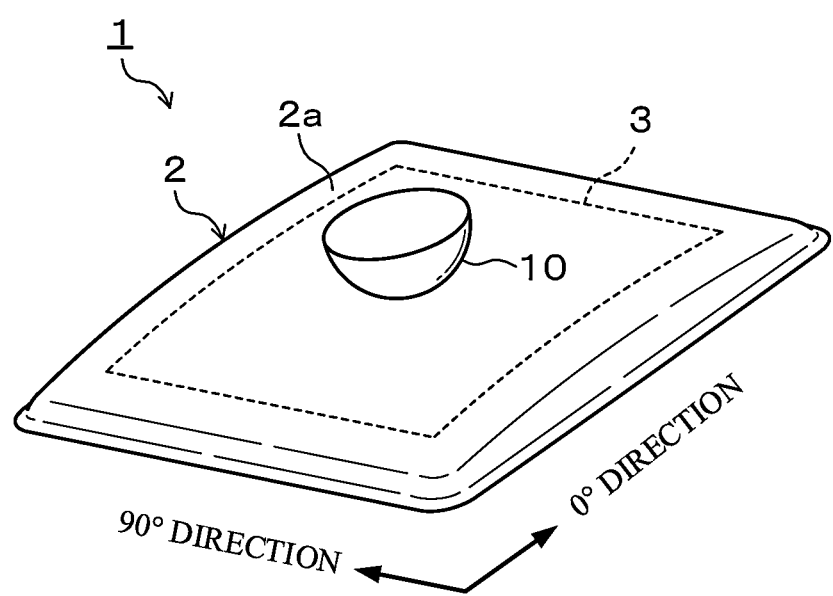
FIG. 9 is a view illustrating a condition for evaluating stretch rigidity.

The stretch rigidity of the curved panel part 1 was evaluated by a method illustrated in FIG. 9. In detail, the stretch rigidity was evaluated by pushing an indenter 10 having a semispherical shape of R50 into a center portion of the curved surface 2a of the curved panel 2 of the curved panel part 1 in which the reinforcement 3 was joined to the curved surface 2b on the opposite side of the load-input side curved surface 2a of the curved panel 2. The stretch rigidity is evaluated by the magnitude of load required when pushing the indenter 10 by 2 mm (referred to as "load at 2 mm stroke", hereinafter), and the curved panel part 1 having a larger load at 2 mm stroke is a member which has higher stretch rigidity and which is more unlikely to be deformed. In this evaluation method, the curved panel 2 is a steel sheet with tensile strength of 590 MPa, and the reinforcement 3 is a member having a plurality of FRP layers with a Young's modulus of 102 GPa.

Further, regarding the curved panel 2, three kinds thereof having different shape indices K as follows were prepared, and the stretch rigidity of each curved panel part was evaluated.

(a) K=0.00083 (curvature radius: 1200 mm)
(b) K=0.00125 (curvature radius: 800 mm)
(c) K=0.00250 (curvature radius: 400 mm)

Evaluation conditions and evaluation results of the stretch rigidity are as described in following Table 1. Note that as comparative examples, the stretch rigidity was also evaluated regarding a case where only the curved panel was used and a case where the CFRP had a single fiber direction.

| | CURVED PANEL | | | | REINFORCEMENT | | | | | | | | | |
|---|---|---|---|---|---|---|---|---|---|---|---|---|---|---|
| | | | | | | | | | FIBER ORIENTATION | | | | | PROPORTION OF LAYERS HAVING ANGULAR DIFFERENCE OF 30° OR MORE RELATIVE TO ALL OF LAYERS |
| | | | | | | | | | OUTER SIDE OF CENTER OF SHEET THICKNESS | | INNER SIDE OF CENTER OF SHEET THICKNESS | | | |
| | MATERIAL | SHEET THICKNESS [mm] | SHAPE INDEX K | VALUE OF LEFT SIDE OF EXPRESSION (1) | MATERIAL | THICKNESS [mm] | AREA OF REINFORCEMENT/ AREA OF PANEL × 100 | 1/6 LAYER | 2/6 LAYER | 3/6 LAYER | 4/6 LAYER | 5/6 LAYER | 6/6 LAYER | NUMBER OF FIBER DIRECTION |
| CASE a1 | STEEL SHEET | 0.65 | 0.00083 | 0.48 | — | — | — | — | — | — | — | — | — | — | — |
| CASE a2 | STEEL SHEET | 0.40 | 0.00083 | 0.48 | — | — | — | — | — | — | — | — | — | — | — |
| CASE a3 | STEEL SHEET | 0.40 | 0.00083 | 0.48 | ALUMINUM SHEET | 0.70 | 100% | — | — | — | — | — | — | — | — |
| CASE a4 | STEEL SHEET | 0.40 | 0.00083 | 0.48 | CFRP | 1.20 (0.20 × 6) | 100% | 0° | 0° | 0° | 0° | 0° | 0° | 1 | 0 |
| CASE a5 | STEEL SHEET | 0.40 | 0.00083 | 0.48 | CFRP | 1.20 (0.20 × 6) | 100% | 15° | 15° | 15° | 15° | 15° | 15° | 1 | 0 |
| CASE a6 | STEEL SHEET | 0.40 | 0.00083 | 0.48 | CFRP | 1.20 (0.20 × 6) | 100% | 30° | 30° | 30° | 30° | 30° | 30° | 1 | 0 |
| CASE a7 | STEEL SHEET | 0.40 | 0.00083 | 0.48 | CFRP | 1.20 (0.20 × 6) | 100% | 45° | 45° | 45° | 45° | 45° | 45° | 1 | 0 |
| CASE a8 | STEEL SHEET | 0.40 | 0.00083 | 0.48 | CFRP | 1.20 (0.20 × 6) | 100% | 60° | 60° | 60° | 60° | 60° | 60° | 1 | 0 |
| CASE a9 | STEEL SHEET | 0.40 | 0.00083 | 0.48 | CFRP | 1.20 (0.20 × 6) | 100% | 75° | 75° | 75° | 75° | 75° | 75° | 1 | 0 |
| CASE a10 | STEEL SHEET | 0.40 | 0.00083 | 0.48 | CFRP | 1.20 (0.20 × 6) | 100% | 90° | 90° | 90° | 90° | 90° | 90° | 1 | 0 |
| CASE a11 | STEEL SHEET | 0.40 | 0.00083 | 0.48 | CFRP | 1.20 (0.20 × 6) | 100% | 90° | 90° | 90° | 90° | 0° | 0° | 2 | 33 |
| CASE a12 | STEEL SHEET | 0.40 | 0.00083 | 0.48 | CFRP | 1.20 (0.20 × 6) | 100% | 0° | 0° | 90° | 0° | 0° | 0° | 2 | 50 |
| CASE a13 | STEEL SHEET | 0.40 | 0.00083 | 0.48 | CFRP | 1.20 (0.20 × 6) | 100% | 0° | 90° | 90° | 90° | 90° | 90° | 2 | 17 |
| CASE a14 | STEEL SHEET | 0.40 | 0.00083 | 0.48 | CFRP | 1.20 (0.20 × 6) | 100% | 0° | 0° | 90° | 90° | 90° | 90° | 2 | 17 |
| CASE a15 | STEEL SHEET | 0.40 | 0.00083 | 0.48 | CFRP | 1.20 (0.20 × 6) | 100% | 45° | −45° | 45° | 90° | 90° | 90° | 2 | 33 |
| CASE a16 | STEEL SHEET | 0.40 | 0.00083 | 0.48 | CFRP | 1.20 (0.20 × 6) | 100% | 45° | −45° | 45° | −45° | 45° | −45° | 2 | 50 |
| CASE a17 | STEEL SHEET | 0.40 | 0.00083 | 0.48 | CFRP | 1.20 (0.20 × 6) | 100% | 60° | −60° | 60° | −60° | 0° | 0° | 3 | 33 |

-continued

| Case | Material 1 | | | | Material 2 | Dim | % | Angle 1 | Angle 2 | Angle 3 | Angle 4 | Angle 5 | Angle 6 | N | Val |
|---|---|---|---|---|---|---|---|---|---|---|---|---|---|---|---|
| CASE a18 | STEEL SHEET | 0.40 | 0.00083 | 0.48 | CFRP | 1.20 (0.20 × 6) | 100% | 0° | 0° | 0° | 0° | 0° | 0° | 2 | 17 |
| CASE a19 | STEEL SHEET | 0.40 | 0.00083 | 0.48 | CFRP | 1.20 (0.20 × 6) | 100% | 30° | 0° | 0° | 0° | 0° | 0° | 2 | 17 |
| CASE a20 | STEEL SHEET | 0.40 | 0.00083 | 0.48 | CFRP | 1.20 (0.20 × 6) | 80% | 90° | 0° | 0° | 0° | 0° | 0° | 2 | 17 |
| CASE b1 | STEEL SHEET | 0.40 | 0.00125 | 0.73 | ALUMINUM SHEET | 0.70 | 100% | — | — | — | — | — | — | 1 | 0 |
| CASE b2 | STEEL SHEET | 0.40 | 0.00125 | 0.73 | CFRP | 1.20 (0.20 × 6) | 100% | 0° | 0° | 0° | 0° | 0° | 0° | 2 | 33 |
| CASE b3 | STEEL SHEET | 0.40 | 0.00125 | 0.73 | CFRP | 1.20 (0.20 × 6) | 100% | 90° | 90° | 90° | 90° | 90° | 90° | 2 | 50 |
| CASE b4 | STEEL SHEET | 0.40 | 0.00125 | 0.73 | CFRP | 1.20 (0.20 × 6) | 100% | 90° | 90° | 0° | 0° | 0° | 0° | 2 | 17 |
| CASE b5 | STEEL SHEET | 0.40 | 0.00125 | 0.73 | CFRP | 1.20 (0.20 × 6) | 100% | 0° | 0° | 90° | 90° | 90° | 90° | 2 | 33 |
| CASE b6 | STEEL SHEET | 0.40 | 0.00125 | 0.73 | CFRP | 1.20 (0.20 × 6) | 100% | 45° | 45° | 45° | 45° | 45° | -45° | 2 | 50 |
| CASE b7 | STEEL SHEET | 0.40 | 0.00125 | 0.73 | CFRP | 1.20 (0.20 × 6) | 100% | 60° | -60° | -60° | -60° | 0° | 0° | 3 | 33 |
| CASE b8 | STEEL SHEET | 0.40 | 0.00125 | 0.73 | CFRP | 1.20 (0.20 × 6) | 100% | 0° | 0° | 0° | 0° | 0° | 90° | 2 | 17 |
| CASE b9 | STEEL SHEET | 0.40 | 0.00125 | 0.73 | CFRP | 1.20 (0.20 × 6) | 100% | 30° | 0° | 0° | 0° | 0° | 0° | 2 | 17 |
| CASE b10 | STEEL SHEET | 0.40 | 0.00125 | 0.73 | ALUMINUM SHEET | 0.70 | 100% | — | — | — | — | — | — | 1 | 0 |
| CASE c1 | STEEL SHEET | 0.40 | 0.00250 | 1.45 | CFRP | 1.20 (0.20 × 6) | 100% | 0° | 0° | 0° | 0° | 0° | 0° | 2 | 33 |
| CASE c2 | STEEL SHEET | 0.40 | 0.00250 | 1.45 | CFRP | 1.20 (0.20 × 6) | 100% | 90° | 90° | 90° | 90° | 90° | 90° | 2 | 50 |
| CASE c3 | STEEL SHEET | 0.40 | 0.00250 | 1.45 | CFRP | 1.20 (0.20 × 6) | 100% | 90° | 90° | 90° | 90° | 0° | 0° | 2 | 17 |
| CASE c4 | STEEL SHEET | 0.40 | 0.00250 | 1.45 | CFRP | 1.20 (0.20 × 6) | 100% | 0° | 0° | 90° | 90° | 90° | 90° | 2 | 33 |
| CASE c5 | STEEL SHEET | 0.40 | 0.00250 | 1.45 | CFRP | 1.20 (0.20 × 6) | 100% | 45° | 45° | 45° | 45° | 45° | -45° | 2 | 50 |
| CASE c6 | STEEL SHEET | 0.40 | 0.00250 | 1.45 | CFRP | 1.20 (0.20 × 6) | 100% | 60° | -60° | -60° | -60° | 0° | 0° | 3 | 33 |
| CASE c7 | STEEL SHEET | 0.40 | 0.00250 | 1.45 | CFRP | 1.20 (0.20 × 6) | 100% | 0° | 0° | 0° | 0° | 0° | 90° | 2 | 17 |
| CASE c8 | STEEL SHEET | 0.40 | 0.00250 | 1.45 | CFRP | 1.20 (0.20 × 6) | 100% | 30° | 0° | 0° | 0° | 0° | 0° | 2 | 17 |

-continued

| | REINFORCEMENT | | | | | | | | | |
|---|---|---|---|---|---|---|---|---|---|---|
| | LAYERS AS A WHOLE | | DIRECTION COMPONENT | | | | | | | |
| | | | OUTER SIDE OF CENTER OF SHEET THICKNESS | | INNER SIDE OF CENTER OF SHEET THICKNESS | | VALUE OF RIGHT SIDE OF EXPRESSION (1) | IS EXPRESSION (1) SATISFIED? | LOAD AT 2 mm STROKE [N] | REMARKS |
| | 0° DIRECTION COMPONENT | 90° DIRECTION COMPONENT | 0° DIRECTION COMPONENT | 90° DIRECTION COMPONENT | 0° DIRECTION COMPONENT | 90° DIRECTION COMPONENT | | | | |
| CASE a1 | — | — | — | — | — | — | — | — | 55 | COMPARATIVE EXAMPLE |
| CASE a2 | — | — | — | — | — | — | — | — | 16 | COMPARATIVE EXAMPLE |
| CASE a3 | — | — | — | — | — | — | — | — | 171 | COMPARATIVE EXAMPLE |
| CASE a4 | 6.00 | 0 | 3.00 | 0 | 3.00 | 0 | 2.50 | YES | 170 | COMPARATIVE EXAMPLE |
| CASE a5 | 5.80 | 1.55 | 2.90 | 0.78 | 2.90 | 0.78 | 1.97 | YES | 157 | COMPARATIVE EXAMPLE |
| CASE a6 | 5.20 | 3.00 | 2.60 | 1.50 | 2.60 | 1.50 | 1.59 | YES | 134 | COMPARATIVE EXAMPLE |
| CASE a7 | 4.24 | 4.24 | 2.12 | 2.12 | 2.12 | 2.12 | 1.25 | YES | 119 | COMPARATIVE EXAMPLE |
| CASE a8 | 3.00 | 5.19 | 1.50 | 2.60 | 1.50 | 2.60 | 0.92 | YES | 105 | COMPARATIVE EXAMPLE |
| CASE a9 | 1.56 | 5.79 | 0.78 | 2.90 | 0.78 | 2.90 | 0.53 | YES | 98 | COMPARATIVE EXAMPLE |
| CASE a10 | 0 | 6.00 | 0 | 3.00 | 0 | 3.00 | 0 | NO | 97 | COMPARATIVE EXAMPLE |
| CASE a11 | 2.00 | 4.00 | 0 | 3.00 | 2.00 | 1.00 | 0.33 | NO | 166 | COMPARATIVE EXAMPLE |
| CASE a12 | 3.00 | 3.00 | 0 | 3.00 | 3.00 | 0 | 0.50 | YES | 188 | EXAMPLE OF PRESENT INVENTION |
| CASE a13 | 5.00 | 1.00 | 2.00 | 1.00 | 3.00 | 0 | 1.83 | YES | 220 | EXAMPLE OF PRESENT INVENTION |
| CASE a14 | 1.00 | 5.00 | 1.00 | 2.00 | 0 | 3.00 | 0.67 | YES | 207 | EXAMPLE OF PRESENT INVENTION |
| CASE a15 | 2.00 | 4.00 | 2.00 | 1.00 | 0 | 3.00 | 1.33 | YES | 220 | EXAMPLE OF PRESENT INVENTION |
| CASE a16 | 4.24 | 4.24 | 2.12 | 2.12 | 2.12 | 2.12 | 1.25 | YES | 211 | EXAMPLE OF PRESENT INVENTION |
| CASE a17 | 4.00 | 3.50 | 1.50 | 2.60 | 2.50 | 0.90 | 1.13 | YES | 197 | EXAMPLE OF PRESENT INVENTION |
| CASE a18 | 5.00 | 1.00 | 3.00 | 0 | 2.00 | 1.00 | 2.33 | YES | 191 | EXAMPLE OF PRESENT INVENTION |
| CASE a19 | 5.87 | 0.50 | 2.87 | 0.50 | 3.00 | 0 | 2.27 | YES | 174 | EXAMPLE OF PRESENT INVENTION |
| CASE a20 | 5.00 | 1.00 | 2.00 | 1.00 | 3.00 | 0 | 1.83 | YES | 201 | EXAMPLE OF PRESENT INVENTION |
| CASE b1 | — | — | — | — | — | — | — | — | 256 | COMPARATIVE EXAMPLE |
| CASE b2 | 6.00 | 0 | 3.00 | 0 | 3.00 | 0 | 2.50 | YES | 255 | COMPARATIVE EXAMPLE |
| CASE b3 | 2.00 | 4.00 | 0 | 3.00 | 2.00 | 1.00 | 0.33 | NO | 229 | COMPARATIVE EXAMPLE |
| CASE b4 | 3.00 | 3.00 | 0 | 3.00 | 3.00 | 0 | 0.50 | NO | 253 | COMPARATIVE EXAMPLE |
| CASE b5 | 5.00 | 1.00 | 2.00 | 1.00 | 3.00 | 0 | 1.83 | YES | 319 | EXAMPLE OF PRESENT INVENTION |
| CASE b6 | 2.00 | 4.00 | 2.00 | 1.00 | 0 | 3.00 | 1.33 | YES | 319 | EXAMPLE OF PRESENT INVENTION |
| CASE b7 | 4.24 | 4.24 | 2.12 | 2.12 | 2.12 | 2.12 | 1.25 | YES | 290 | EXAMPLE OF PRESENT INVENTION |
| CASE b8 | 4.00 | 3.50 | 1.50 | 2.60 | 2.50 | 0.90 | 1.13 | YES | 277 | EXAMPLE OF PRESENT INVENTION |
| CASE b9 | 5.00 | 1.00 | 3.00 | 0 | 2.00 | 1.00 | 2.33 | YES | 282 | EXAMPLE OF PRESENT INVENTION |
| CASE b10 | 5.87 | 0.50 | 2.87 | 0.50 | 3.00 | 0 | 2.27 | YES | 260 | EXAMPLE OF PRESENT INVENTION |
| CASE c1 | — | — | — | — | — | — | — | — | 148 | COMPARATIVE EXAMPLE |
| CASE c2 | 6.00 | 0 | 3.00 | 0 | 3.00 | 0 | 2.50 | YES | 148 | COMPARATIVE EXAMPLE |
| CASE c3 | 2.00 | 4.00 | 0 | 3.00 | 2.00 | 1.00 | 0.33 | NO | 147 | COMPARATIVE EXAMPLE |
| CASE c4 | 3.00 | 3.00 | 0 | 3.00 | 3.00 | 0 | 0.50 | YES | 138 | COMPARATIVE EXAMPLE |
| CASE c5 | 5.00 | 1.00 | 2.00 | 1.00 | 3.00 | 0 | 1.83 | YES | 151 | EXAMPLE OF PRESENT INVENTION |
| CASE c6 | 2.00 | 4.00 | 2.00 | 1.00 | 0 | 3.00 | 1.33 | NO | 91 | COMPARATIVE EXAMPLE |
| CASE c7 | 4.24 | 4.24 | 2.12 | 2.12 | 2.12 | 2.12 | 1.25 | NO | 136 | COMPARATIVE EXAMPLE |
| CASE c8 | 4.00 | 3.50 | 1.50 | 2.60 | 2.50 | 0.90 | 1.13 | NO | 146 | COMPARATIVE EXAMPLE |

-continued

| | | | | | | | | | |
|---|---|---|---|---|---|---|---|---|---|
| CASE c9 | 5.00 | 1.00 | 3.00 | 0 | 2.00 | 1.00 | 2.33 | YES | 150 | EXAMPLE OF PRESENT INVENTION |
| CASE c10 | 5.87 | 0.50 | 2.87 | 0.50 | 3.00 | 0 | 2.27 | YES | 149 | EXAMPLE OF PRESENT INVENTION |

As indicated in Table 1, the load at 2 mm stroke of each of CASE a3 to CASE a20 in which the reinforcement is joined to the curved panel, becomes larger than the load at 2 mm stroke of each of CASE a1 and CASE a2 using only the curved panel, and thus it can be confirmed that the stretch rigidity is improved when the reinforcement is joined to the curved panel.

The reinforcement of each of CASE a4 to CASE a10 has a structure in which six CFRP layers each having a thickness of 0.20 mm are stacked. Although the weight of the CFRP with a sheet thickness of 1.20 mm (0.20 mm×6) is about the same as the weight of an aluminum sheet of 0.70 mm used as the reinforcement of CASE a3, the load at 2 mm stroke of each of CASE a4 to CASE a9 is smaller than the load at 2 mm stroke of CASE a3, and thus the stretch rigidity of each of CASE a4 to CASE a9 is inferior to that of CASE a3. On the other hand, each of CASE a12 to a20 using the CFRP having two or three fiber directions satisfies the expression (1), similarly to CASE a4 to CASE a9, but the load at 2 mm stroke of each of CASE a12 to a20 is larger than that of each of CASE a3 to CASE a9, and thus the stretch rigidity of each of CASE a12 to a20 is improved. Based on this result, it can be confirmed that when the reinforcement in which at least one layer out of the plurality of FRP layers has a fiber direction different from that of another layer, in the plurality of FRP layers, a proportion of layers having an angular difference in the fiber direction of 30° or more is 15% or more of all of the layers, and the expression (1) is satisfied, is joined to the curved panel, the stretch rigidity as the curved panel part is improved. In particular, in each of CASE a12 to a20, the stretch rigidity is improved more than that of CASE a3 using the aluminum sheet which is advantageous for the reduction in weight. Specifically, the curved panel part of each of CASE a12 to a20 being invention examples is excellent in mass efficiency of the stretch rigidity, and can realize both the stretch rigidity and the reduction in weight at high level.

Further, also in results of CASE b1 to b10 and CASE c1 to c10 having different shape indices K with respect to those of CASE a1 to a20, it is indicated that when at least one layer has a fiber direction different from that of another layer, in the plurality of FRP layers, a proportion of layers having an angular difference in the fiber direction of 30° or more is 15% or more of all of the layers, and the expression (1) is satisfied, the stretch rigidity of the curved panel part is improved. In particular, in each of CASE b5 to b10 being invention examples, the stretch rigidity is improved more than that of CASE b1 using the aluminum sheet which is advantageous for the reduction in weight. Further, in each of CASE c5, c9, and c10 being invention examples, the stretch rigidity is improved more than that of CASE c1 using the aluminum sheet which is advantageous for the reduction in weight. Therefore, the curved panel part of each of CASE b5 to b10 and CASE c5, c9, and c10 also has a structure excellent in the mass efficiency of the stretch rigidity, similarly to the above-described CASE a12 to a20. Specifically, the curved panel part according to the present invention is a member capable of realizing both the stretch rigidity and the reduction in weight at high level, regardless of the shape index K of the curved panel.

The size (area) of the reinforcement in CASE a13 and that in CASE a20 are mutually different. In detail, in CASE a13, the reinforcement is joined to the region of the curved panel in its area of 100%, similarly to the other Examples except for CASE A20, and in CASE a20, the reinforcement is joined to the region of the curved panel in its area of 80%. Although the stretch rigidity is evaluated in CASE a13 and CASE a20 under the same condition except for the condition regarding the size of the reinforcement, the load at 2 mm stroke took a high value in both CASE a13 and CASE a20. Based on this result, it can be confirmed that even if the reinforcement is not joined to the entire surface of the curved panel, it is possible to sufficiently obtain the effect of improving the stretch rigidity.

Although the layer structure when using the CFRP as the reinforcement was set to have six layers in the above Table 1, the stretch rigidity regarding the case of four-layer structure was also evaluated based on the method in FIG. 9. Evaluation results are as described in following Table 2

| | CURVED PANEL | | | | REINFORCEMENT | | |
|---|---|---|---|---|---|---|---|
| | MATERIAL | SHEET THICKNESS [mm] | SHAPE INDEX K | VALUE OF LEFT SIDE OF EXPRESSION (1) | MATERIAL | SHEET THICKNESS [mm] | AREA OF REINFORCEMENT/ AREA OF PANEL × 100 |
| CASE a21 | STEEL SHEET | 0.40 | 0.00083 | 0.48 | CFRP | 0.80 (0.20 × 4) | 100% |
| CASE a22 | STEEL SHEET | 0.40 | 0.00083 | 0.48 | CFRP | 0.80 (0.20 × 4) | 100% |

| | REINFORCEMENT FIBER ORIENTATION | | | | | |
|---|---|---|---|---|---|---|
| | OUTER SIDE OF CENTER OF SHEET THICKNESS | | INNER SIDE OF CENTER OF SHEET THICKNESS | | NUMBER OF FIBER DIRECTION | PROPORTION OF LAYERS HAVING ANGULAR DIFFERENCE OF 30° OR MORE RELATIVE TO ALL OF LAYERS |
| | 1/4 LAYER | 2/4 LAYER | 3/4 LAYER | 4/4 LAYER | | |
| CASE a21 | 0° | 0° | 0° | 0° | 1 | 0 |
| CASE a22 | 0° | 0° | 0° | 90° | 2 | 25 |

-continued

| | REINFORCEMENT DIRECTION COMPONENT | | | | |
|---|---|---|---|---|---|
| | LAYERS AS A WHOLE | | OUTER SIDE OF CENTER OF SHEET THICKNESS | | INNER SIDE OF CENTER OF SHEET THICKNESS |
| | 0° DIRECTION COMPONENT | 90° DIRECTION COMPONENT | 0° DIRECTION COMPONENT | 90° DIRECTION COMPONENT | 0° DIRECTION COMPONENT |
| CASE a21 | 4.00 | 0 | 2.00 | 0 | 2.00 |
| CASE a22 | 3.00 | 1.00 | 2.00 | 0 | 1.00 |

| | INNER SIDE OF CENTER OF SHEET THICKNESS 90° DIRECTION COMPONENT | VALUE OF RIGHT SIDE OF EXPRESSION (1) | IS EXPRESSION (1) SATISFIED? | LOAD AT 2 mm STROKE [N] | REMARKS |
|---|---|---|---|---|---|
| CASE a21 | 0 | 2.50 | YES | 129 | COMPARATIVE EXAMPLE |
| CASE a22 | 1.00 | 2.25 | YES | 151 | EXAMPLE OF PRESENT INVENTION |

As indicated in Table 2, even in the case of four-layer structure, when at least one layer has a fiber direction different from that of another layer, in the plurality of FRP layers, a proportion of layers having an angular difference in the fiber direction of 30° or more is 15% or more of all of the layers, and the expression (1) is satisfied, it can be confirmed that the stretch rigidity is improved. Specifically, from a viewpoint of obtaining the effect of improving the stretch rigidity according to the present invention, the total number of the plurality of FRP layers is not particularly limited.

Incidentally, as a material made of the FRP, there is a material formed in a manner that fibers in two or more directions are woven in one layer of the FRP (so-called a cloth fabric), and when the stretch rigidity regarding the cloth fabric was evaluated based on the method in FIG. 9, the effect of improving the stretch rigidity was small.

INDUSTRIAL APPLICABILITY

The present invention can be used as a structure of a door outer panel, a roof panel, a hood, a fender, a side outer panel, or the like of an automobile.

EXPLANATION OF CODES

1 curved panel part
2 curved panel
2a load-input side surface of curved panel
2b surface of curved panel on opposite side of load-input side
3 reinforcement
3a 0° oriented layer
3b 90° oriented layer
3c 45° oriented layer
3d −45° oriented layer
10 indenter
$T_c$ center of sheet thickness of reinforcement

The invention claimed is:

1. A curved panel part, comprising:
a curved panel made of metal; and
a reinforcement joined to the curved panel and made of a plurality of fiber reinforced plastic (FRP) layers including continuous fibers, wherein:
each of the plurality of FRP layers has a single fiber direction;
at least one layer out of the plurality of FRP layers has a fiber direction different from that of another layer;
in the plurality of FRP layers, a proportion of layers having an angular difference in the fiber direction of 30° or more is 15% or more of all of the layers; and
when calculating, by defining a maximum principal curvature direction of the curved panel as a 0° direction and a direction orthogonal to the 0° direction as a 90° direction, each of a 0° direction component and a 90° direction component regarding the fiber direction of each FRP layer of the reinforcement joined to the curved panel, by using a trigonometric function, a following expression (1) is satisfied:

$$580 \times K \leq (A \times 4 + B)/(C + D) \tag{1}$$

A: the 0° direction component of the FRP layers positioned on an outer side of a center of a sheet thickness of the reinforcement
B: the 0° direction component of the FRP layers positioned on an inner side of the center of the sheet thickness of the reinforcement
C: the 0° direction component of the plurality of FRP layers as a whole
D: the 90° direction component of the plurality of FRP layers as a whole
K: 1/curvature radius of the curved panel in the 0° direction (mm).

2. The curved panel part according to claim 1, wherein the reinforcement is joined to the curved panel in its area of 70% or more.

3. The curved panel part according to claim 1, wherein the reinforcement is joined to the entire surface of the curved panel.

4. The curved panel part according to claim 1, wherein a sheet thickness of the reinforcement is 2.0 times or more a sheet thickness of the curved panel.

5. The curved panel part according to claim 1, wherein:
the curved panel is a hood or a roof panel of an automobile; and
the reinforcement is joined to a lower surface of the curved panel.

6. The curved panel part according to claim 1, wherein:
the curved panel is a fender, a door outer panel, or a side outer panel of an automobile; and
the reinforcement is joined to a vehicle-interior side surface of the curved panel.

7. The curved panel part according to claim 1, wherein the curved panel is a steel sheet with 440 MPa or more.

8. The curved panel part according to claim 1, wherein the FRP is a carbon fiber reinforced plastic (CFRP).

9. The curved panel part according to claim 1, wherein the FRP is a glass fiber reinforced plastic (GFRP).

* * * * *